United States Patent
Kim

(10) Patent No.: US 8,694,458 B2
(45) Date of Patent: Apr. 8, 2014

(54) MAKING ESTIMATIONS OR PREDICTIONS ABOUT DATABASES BASED ON DATA TRENDS

(75) Inventor: Sung Jin Kim, Buena Park, CA (US)

(73) Assignee: Teradata US, Inc., Dayton, OH (US)

( * ) Notice: Subject to any disclaimer, the term of this patent is extended or adjusted under 35 U.S.C. 154(b) by 260 days.

(21) Appl. No.: 13/332,473

(22) Filed: Dec. 21, 2011

(65) Prior Publication Data
US 2013/0166486 A1   Jun. 27, 2013

(51) Int. Cl.
*G06F 17/00* (2006.01)
*G06N 5/02* (2006.01)

(52) U.S. Cl.
USPC .......................................................... 706/46

(58) Field of Classification Search
None
See application file for complete search history.

(56) References Cited

U.S. PATENT DOCUMENTS

2009/0245107 A1* 10/2009 Krishnaswamy et al. .... 370/232
2011/0205064 A1* 8/2011 Strachan et al. ........... 340/573.1
2011/0320715 A1* 12/2011 Ickman et al. ................ 711/118

OTHER PUBLICATIONS

Tome et al. "Piecewise linear fitting and trend changing points of climate parameters", Geophysical Research Letters, vol. 31, 2004, pp. 4.*

* cited by examiner

*Primary Examiner* — Li-Wu Chang
(74) *Attorney, Agent, or Firm* — Ramin Mahboubian

(57) ABSTRACT

Data trends that are based on historical data of a database can be used to make estimations and/or predications about the database. In other words, historical trends of a database can be used to make estimation about the data of the database. By way of example, a prediction can be made regarding the data change in the data since the Statistics has been collected. An estimation about data in a database can be used instead of actual data that would have to be collected as Statistics for the database. As a result, Statistics can be collected less frequently but estimation and/or predictions about the database can be used to optimize the execution of queries of the database. Also, collection of Statistics for database can be altered by using estimation about the Statistics of the database by collecting Statistics less frequently or for longer periods of time.

34 Claims, 17 Drawing Sheets

FIG. 3B
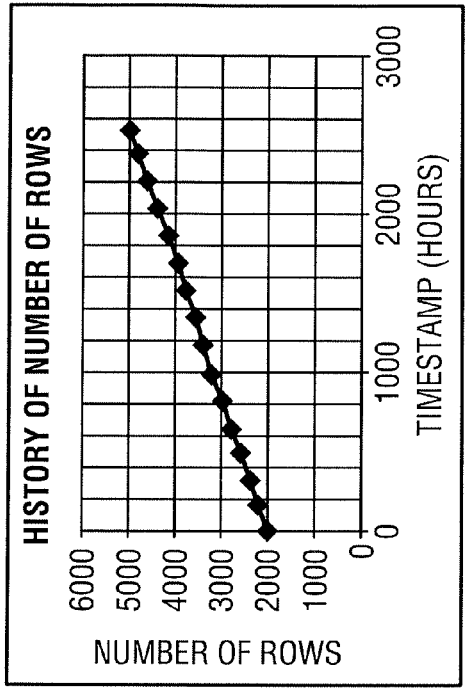
FIG. 3C
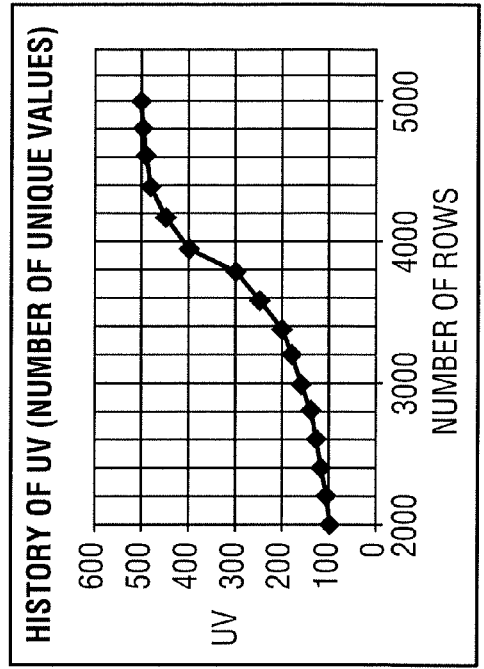
FIG. 3A
| HISTORY RECORD NO. | TIMESTAMP (HOURS) | NUMBER OF ROWS | NUMBER OF UNIQUE VALUES |
|---|---|---|---|
| 0 | 2520 | 5000 | 500 |
| 1 | 2377 | 4805 | 496 |
| 2 | 2201 | 4610 | 490 |
| 3 | 2030 | 4395 | 482 |
| 4 | 1858 | 4170 | 450 |
| 5 | 1685 | 3950 | 400 |
| 6 | 1512 | 3788 | 300 |
| 7 | 1344 | 3580 | 250 |
| 8 | 1166 | 3379 | 200 |
| 9 | 988 | 3205 | 180 |
| 10 | 810 | 2990 | 160 |
| 11 | 644 | 2805 | 140 |
| 12 | 488 | 2600 | 130 |
| 13 | 320 | 2395 | 120 |
| 14 | 160 | 2198 | 110 |
| 15 | 0 | 2000 | 100 |

| HISTORY RECORD NO. | TIMESTAMP (HOURS) | NUMBER OF ROWS | NUMBER OF UNIQUE VALUES | MINVAL | MAXVAL |
|---|---|---|---|---|---|
| 0 | 2201 | 5500 | 558 | 100 | 1250 |
| 1 | 2030 | 5300 | 520 | 100 | 1250 |
| 2 | 1858 | 5400 | 542 | 100 | 1250 |
| 3 | 1685 | 5200 | 520 | 100 | 1250 |
| 4 | 1512 | 5500 | 530 | 100 | 1250 |
| 5 | 1344 | 5000 | 520 | 100 | 1250 |
| 6 | 1166 | 6000 | 600 | 100 | 1250 |
| 7 | 988 | 7500 | 610 | 100 | 1250 |
| 8 | 810 | 8500 | 850 | 100 | 1250 |
| 9 | 644 | 8000 | 850 | 100 | 1250 |
| 10 | 488 | 5500 | 750 | 100 | 950 |
| 11 | 320 | 2500 | 300 | 100 | 750 |
| 12 | 160 | 3000 | 500 | 100 | 750 |
| 13 | 0 | 1000 | 50 | 0 | 500 |

MAKING ESTIMATIONS OR PREDICTIONS ABOUT DATABASES BASED ON DATA TRENDS

BACKGROUND

The term database can refer to a collection of data and/or data structures typically stored in a digital form. Data can be stored in a database for various reasons and to serve various entities or "users." Generally, data stored in the database can be used by the database users. A user of a database can, for example, be a person, a database administrator, a computer application designed to interact with a database, etc. A very simple database or database system can, for example, be provided on a Personal Computer (PC) by storing data on a Hard Disk (e.g., contact information) and executing a computer program that allows access to the data. The executable computer program can be referred to as a database program or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and some databases that are for various business and organizations (e.g., banks, retail stores, governmental agencies, universities) in use today can be very complex and support several users simultaneously by providing very complex queries (e.g., give me the name of all customers under the age of thirty five (35) in Ohio that have bought all items in a list of items in the past month in Ohio and also have bought ticket for a baseball game in San Diego and purchased a baseball in the past 10 years).

Typically, a Database Manager (DM) or a Database Management System (DBMS) is provided for relatively large and/or complex databases. As known in the art, a DBMS can effectively manage the database or data stored in a database, and serve as an interface for the users of the database. A DBMS can be provided as an executable computer program (or software) product as is also known in the art.

It should also be noted that a database can be organized in accordance with a Data Model. Notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation language, and a Query Language.

Today, databases have become prevalent in virtually all aspects of business and personal life. Moreover, database use is likely to continue to grow even more rapidly and widely across all aspects of commerce. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A popular type of database is the relational Database Management System (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One important objective of databases and in particular DBMS is to optimize the performance of queries for access and manipulation of data stored in the database. Given a target environment, an "optimal" query plan can be selected as the best option by a database optimizer (or optimizer). Ideally, an optimal query plan is a plan with the lowest cost (e.g., lowest response time, lowest CPU and/or I/O processing cost, lowest network processing cost). The response time can be the amount of time it takes to complete the execution of a database operation, including a database request (e.g., a database query) in a given system. In this context, a "workload" can be a set of requests, which may include queries or utilities, such as, load that have some common characteristics, such as, for example, application, source of request, type of query, priority, response time goals, etc.

Generally, data (or "Statistics") can be collected and maintained for a database. "Statistics" can be useful for various purposes and for various operational aspects of a database. In particular, "Statistics" regarding a database can be very useful in optimization of the queries of the database, as generally known in the art.

In view of the prevalence of databases in various aspects life today and importance of Statistics of database operations, it is apparent that techniques relating to Statistics of databases would be very useful.

SUMMARY

Broadly speaking, the invention relates to computing systems and computing environments. More particularly, the invention relates to techniques for making estimations about databases.

In accordance with one aspect of the invention, data trends that are based on historical data of a database can be used to make estimations and/or predications about the database. In other words, historical trends of a database can be used to make estimation about the data of the database. By way of example, a prediction can be made regarding the data change in the data since the Statistics has been collected. It will also be appreciated that the estimation can be made based a selected one of multiple data trends that are, in turn, at least partly based historical data of the database that can be indicative of the data that has been stored in the database. In general, historical data can be used to make estimations regarding a database, including estimations made about Statistics and data provided as input to the database.

In accordance with another aspect of the invention, an estimation or a prediction about data in a database, among other things, can be used instead of actual data that would have to be collected as Statistics for the database. As a result, Statistics can be collected less frequently but estimation and/or predictions about the database can be used to, among other things, optimize the execution of queries of the database.

In accordance with yet another aspect of the invention, collection of Statistics for database can be altered by using estimation about the Statistics of the database, for example, by collecting Statistics less frequently or for longer periods of time.

The invention can be implemented in numerous ways, including, for example, a method, an apparatus, a computer readable medium, a database system, and a computing system (e.g., a computing device). A computer readable medium can, for example, include at least executable code stored in a tangible or non-transient form.

For example, in one embodiment, a computing system can be operable to obtaining one of multiple data trends as a selected estimation trend, where the multiple data trends are trends at least partly based on historical data of the database indicative of the data that has been stored in the database; and make an estimation about data in the database based on the selected estimation trend.

As another example, in accordance with another embodiment, a method can be provided to make a projection about data of a database at least partly based on a set of historical records of the database. In doing so, multiple data trends can be determined by considering, at least one of the historical records that is more recent, more heavily than, at least another one of the historical records that is relatively less recent. Then, one or more of the multiple data trends that meet a stability threshold can be selected as one or more stable data trends. Thereafter, one of the one or more stable data trends that includes most of the historical records of the set of historical records can be selected as an estimation trend which can be used to make estimation about data in the database based.

Other aspects, embodiment and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 3A-3C depict historical records pertaining and collected Statistics that can be used in various embodiment of the invention.

DETAILED DESCRIPTION

Figure 1:
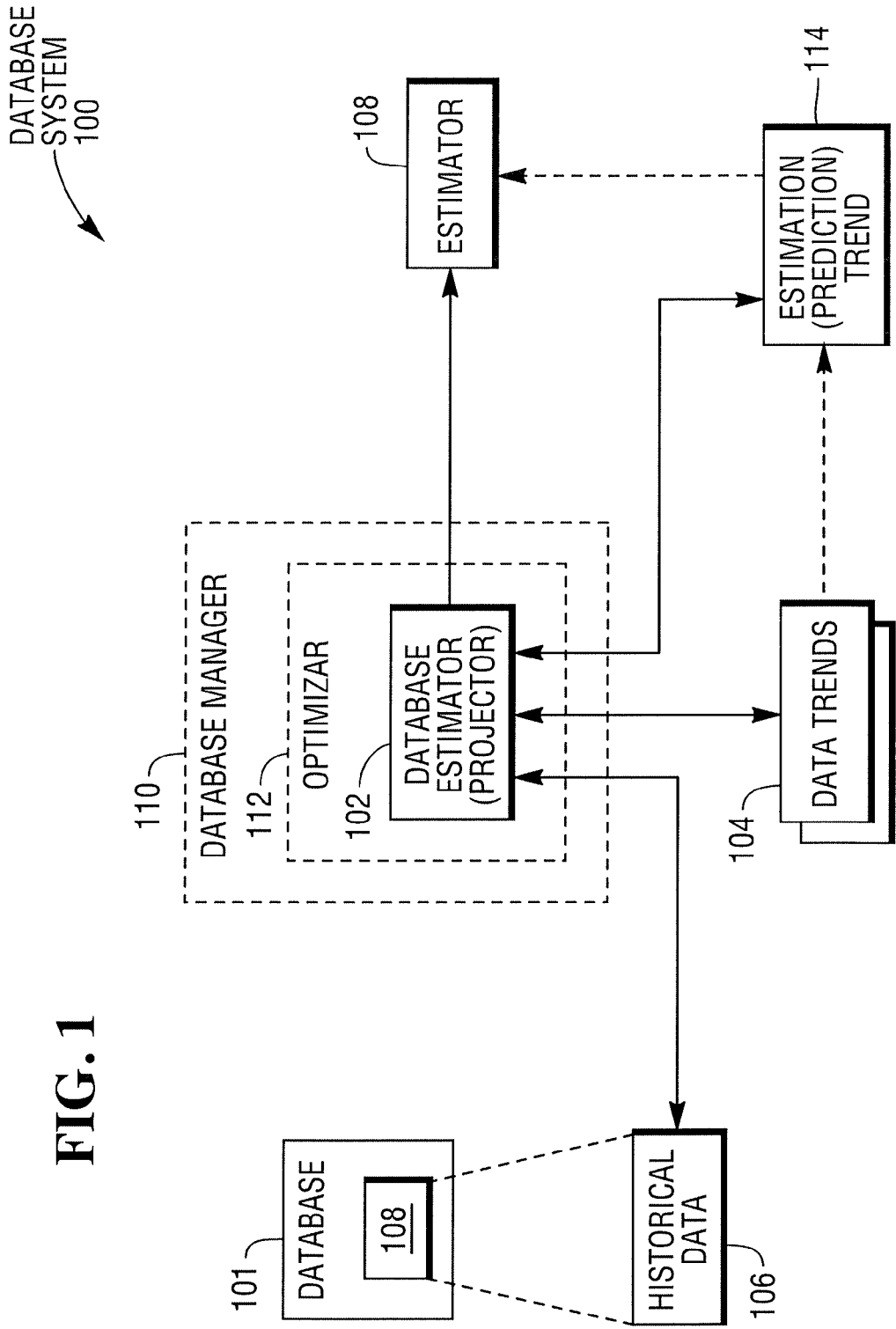
FIG. 1 depicts a database system that includes a database estimator in accordance with one embodiment of the invention.

As noted in the background section, databases have become prevalent in virtually all aspects of business and commerce. Moreover, database use is likely to grow even more rapidly and widely across all aspects of life. Generally, databases and DBMS that manage them can be very large and extremely complex, partly in order to support an ever increasing need to store data and analyze data. Typically, larger databases are used by larger organizations. Larger databases are supported by a relatively large amount of capacity, including computing capacity (e.g., processor, memory, Input and Output (I/O) capabilities) to allow them to perform many tasks and/or complex tasks effectively at the same time (or in parallel). On the other hand, smaller databases systems are also available today and can, for example, be used by smaller organizations. In contrast to larger databases, smaller databases can operate with less capacity. In either case, however, techniques for collection of Statistics and/or making estimation about a data would very useful.

In particular, techniques for making estimation and/or predictions about database are needed. It will be appreciated that the ability to make estimations or predictions about data of a database can, among other things, be used to collect Statistics more efficiently. Conventionally, Statistics have be collected frequently as they become stale (or outdated for their intended use). However, collecting Statistics can be costly as it takes computing resources (e.g., processing time) to collect data. Moreover, it may not be ideal or feasible at least in some applications to frequently and continuously collect Statistics so that database operations can be optimized at the expense of performing these operations in the first place.

Accordingly, techniques for estimating or predicting databases are needed. In particular, techniques for estimations about data associated with a database that can be used in optimization of database queries from that database are needed, as that would, among other things, allow Statistics to be collected less frequently for the purpose of optimizing the database queries from the database.

As such, it will appreciated that in accordance with one aspect of the invention, data trends that are based on historical data of a database can be used to make estimations and/or predications about the database. In other words, historical trends of a database can be used to make estimation about the data of the database. By way of example, a prediction can be made regarding the data change in the data since the Statistics has been collected. It will also be appreciated that the estimation can be made based a selected one of multiple data trends that are, in turn, at least partly based historical data of the database that can be indicative of the data that has been stored in the database.

In accordance with another aspect of the invention, an estimation or a prediction about data in a database, among other things, can be used instead of actual data that would have to be collected as Statistics for the database. As a result, Statistics can be collected less frequently as estimation and/or predictions about the database based on historical data could be used to, among other things, optimize the execution of queries of the database.

In accordance with yet another aspect of the invention, collection of Statistics for database can be altered by using estimation about the Statistics of the database, for example, by collecting Statistics less frequently or for longer periods of time.

Embodiments of these aspects of the invention are also discussed below with reference to FIGS. 1-12. However, those skilled in the art will readily appreciate that the detailed description given herein with respect to these figures is for explanatory purposes as the invention extends beyond these limited embodiments.

FIG. 1 depicts a database system 100 that includes a database estimator, predictor and/or projector 102 ("database estimator" or "estimator" hereinafter) 102 in accordance with one embodiment of the invention. As suggested by FIG. 1, the database system 100 may also include a database manager 110 (e.g., Database Management System (DBMS), a Relational Database Management System (RDBMS)) that effectively manages a database 101. As such, the database estimator 102 may, for example, be provided as a part of the database manager 110. More particularly, it will be appreciated that the database estimator 102 can be provided as a part of an optimizer 112 in the database manager 110. Of course, as shown in FIG. 1, the database estimator 102 can be provided as a separate component. Furthermore, it is not necessary to use a database manager 110 and/or an optimizer 112 as the database estimator 102 can operate independently and separately from these components.

Those skilled in the art will also readily appreciate that database estimator can be implemented at least partly as a computer executable program and/or as a hardware component. For example, the database estimator 102 can be provided as executable computer code stored in memory (not shown) and executed by one or more processors (not shown).

In any case, it will be appreciated that the database estimator 102 can make estimations regarding a database 102. It should be noted that the estimations can, for example, include estimation and/or projections about data stored in the database 101, projections and/or predictions about data that may be stored in the database 102 in the future, etc. In making an estimation about the database 101, the database estimator 102 can obtain (e.g., determine, receive, select) multiple data trends 104 for data of the database 101. Generally, the data trends are trends that are at least partly based on historical data 106 of the database 101. It will be appreciated that historical data 106 can include actual data 108 stored in the database 101. As such, the historical data 106 can represent raw data 108 in the form readily available in the database 101 or data effectively derived or obtained from the raw data in the database 101.

In any case, the database estimator 102 can make an estimation (or prediction or projection) about the database 101 based on selected one of the data trends 104, namely an estimation trend 114. As such, the estimator 102 may also be operable to select the estimation trend 114 from the data trends 104. It will be appreciated that the selected data trend 114 (or estimation trend 114) can be selected as a data trend that is likely to provide the most accurate estimation about the database 101, or is likely to be the best candidate among the data trends 104 for making an estimation about the database 101.

Figure 2:
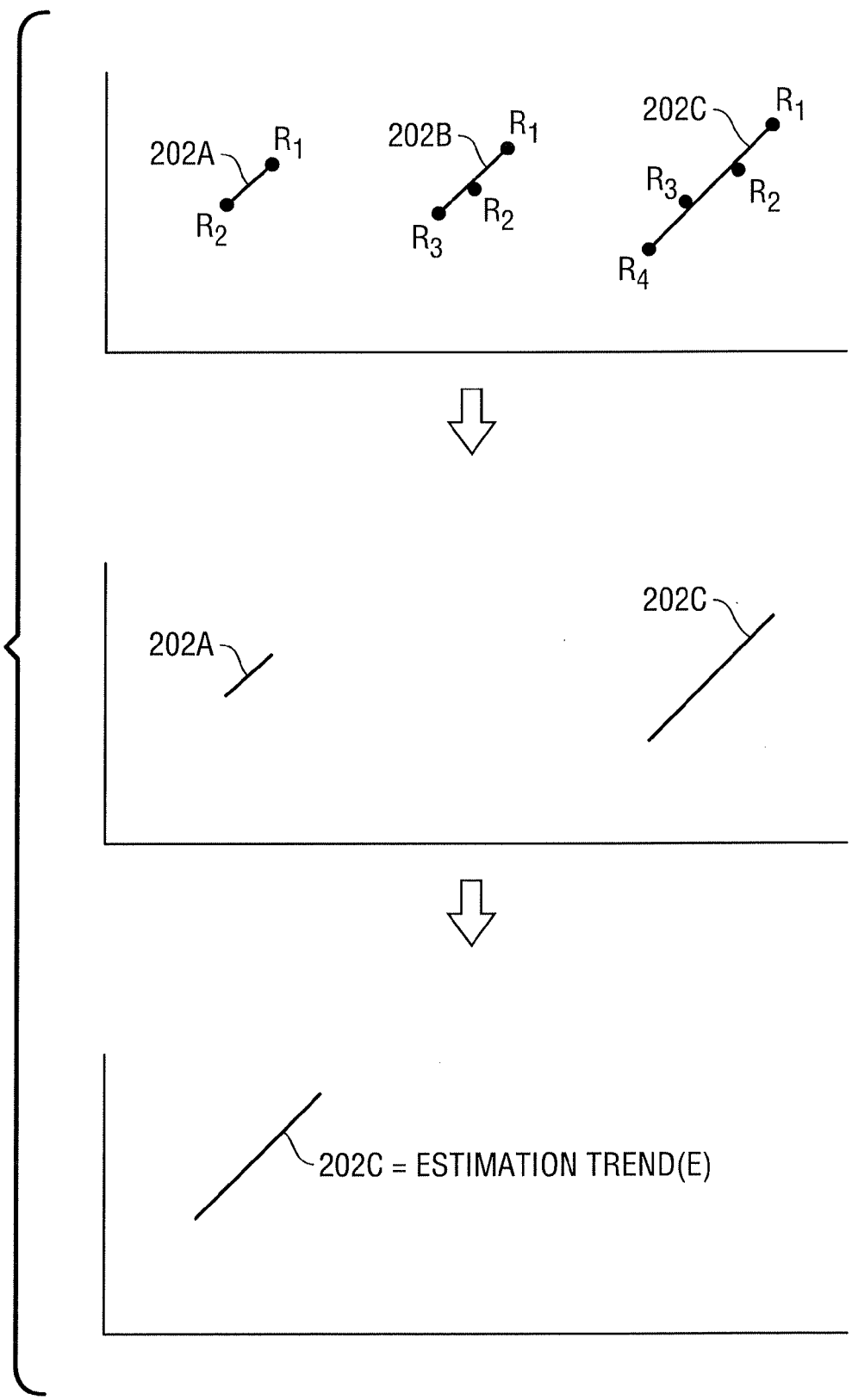
FIG. 2 depicts a very simplified process for determining data trends 104 and selecting one of the data trends as an estimation trend for making a prediction about a database in accordance with one embodiment of the invention.

To further elaborate, FIG. 2 depicts a very simplified process for determining data trends 104 and selecting one of the data trends 104 (also shown in FIG. 1) as an estimation trend for making a prediction about a database in accordance with one embodiment of the invention. Referring to FIG. 2, it should be noted that data trends 104 can, for example, be represented as data trend lines (e.g., linear trend lines) 202 (202A, 202B and 202C) between historical records in the historical data of a database. Typically, data trend lines (or trend lines) 102 are reflective of more recent data and/or effectively take into account more recent data records more heavily than less recent data records in the historical data 106 (also shown in FIG. 1) of the database 101. By way of example, a trend line 202 can be effectively drawn from a most recent historical record R1 to the next recent historical record R2, a data trend line 204 can also start at the most recent historical record R1 but extent further the next recent historical record R3 from R3, and so on. As such, data trend lines 202 can be effectively drawn from a most recent historical data record R1 in the historical data to decreasingly less recent historical data records (R2, R3, and so on). This means that the trend lines 202 can include most and more recent historical records. Generally, however, trend lines 202 can be drawn in a manner that would give more weight to the more recent historical data in comparison to less recent historical data (e.g., trend lines 202 can be drawn from more recent to less recent historical records. In other words, historical record R1 need not necessarily be the most recent historical record but it can be and it may be more useful at least in some application to consider the most recent historical records that may be available in the database.

In any case, referring to FIG. 2, a number of data trend lines 202 that do not meet a stability threshold can be eliminated as those skilled in the art will appreciate. As a result, for example, a data trend 202B that does not meet a determined or predetermined threshold value can be eliminated to leave only data trends 202A and 202B for consideration as an estimation trend as depicted in FIG. 2. Thereafter, the data trend 202 C can be selected as the estimation trend E because it meets the stability threshold and it is based on more data records than the only other possible candidate (202A). In other words, a data trend line that is the longest line among the data trend lines that meet the stability threshold (or stable data trend lines) can be selected as the estimation trend E to make an estimation about the database. An estimation about the database can, for example, be made as an estimation about data that has been stored in the database, as a prediction about data that might be stored in the database in the future, as a projection about the data of the database, etc.

To elaborate even further, FIGS. 3A, 3B and 3C depict a simplified example of a database where estimations can be made regarding the database in accordance with one embodiment of the invention. Of course, only a limited number of records are shown in the example. In the example, assume that a retail store keeps track of the information about purchases of various items into a relation, Orders (order_id, order_date, item, quantity) where purchased item codes are stored in the third column, item. FIG. 3A depicts the historical records (0-15) pertaining to this relation. It should be noted that the relation has eventually grown from 2000 rows to 5000 rows in a time period as shown in FIG. 3B. In the same time period, Statistics on the number of unique values (UV), on item, has been collected every week (or roughly, every 168 hours). UV has been observed from 100 to 500, as shown in FIG. 3C. It should be noted that here "TimeStamp" represents the number of elapsed hours after the tables in FIGS. 3B and 3C are created. One problem to be solved is how to estimate the number of rows and UV on item, when a query is issued at a time when no data is available (e.g., at a timestamp of 2600 or 3000 when data is only collected up to the timestamp (or time) 2500). It will be appreciated that this estimation can be made based on historical data in accordance with the techniques of the invention.

Specifically, as those skilled in the art will appreciate, a history record $h_i$ in Historical records or History H can be represented as $h_i \rightarrow [x_i, y_i]$ where the subscript i can be an integer representing the chronological order of history records in H, and the smaller an i is, the younger the $h_i$ would be. A pair of a variable and a statistical value or variable (or statistic) at a given time can be referred to as a historical record (or history record) of the statistic with regard to the variable. As those skilled in the art will realize, a historical record can be represented as a data point in an X-Y coordinate, where X-axis is the variable and Y-axis is the statistic.

There are at least two types of historical records (or history record), namely, one that keeps $h_i \rightarrow$[timestamp, number of rows] and another that keeps $h_i \rightarrow$[number of rows, a statistical value]. For example, the number of unique values is a type of statistical values.

Historical records can, for example, be modeled as a linear function, which can also be called a "Linear Trend. A "Linear Trend" can be used to estimate a statistic for a given variable (e.g., extrapolation, interpolation).

In FIG. 3A, as an example of the second type of historical records, where $h_i \rightarrow$[number of rows, a statistical value], the youngest record is $h_0 \rightarrow$[5000, 500], and the oldest is $h_{15} \rightarrow$ [2000, 100]. In this example, a data trend line (or trend line or "trend") can be represented as a linear trend line, y=slope*x+intercept, which fits a given n historical records as close as possible, where y is the variable to be estimated and x is the variable to be given. The standard error (stderr) of a trend line can show how closely a trend line is drawn to history records. The determination of slope, intercept, and stderr can, for example, be done by the following formulae or others that may be widely known in the literature of linear regression analysis. It should be noted that the limit of the summations shown, which can be i to n, and also the summation indices on x and y have been omitted here for brevity. Generally, the n should be greater than 1. When the n is 2, stderr can be 1.

$$slope = \frac{n \sum (xy) - \sum x \sum y}{n \sum (x^2) - (\sum x)^2}$$

$$intercept = \frac{\sum y - slope \sum x}{n}$$

$$stderr = \sqrt{\frac{\left(\sum (y^2) - \frac{(\sum y)^2}{n}\right) - slope \cdot \left((\sum xy) - \frac{(\sum x) \cdot (\sum y)}{n}\right)}{(n-2)}}$$

Among the data trend lines that can be drawn from a subset of historical records, a single trend line satisfying the following three conditions or constraints can be selected for making an estimation and can be used as estimated Statistics, for example to optimize execution of database queries.

In the context of this selection, the first condition can be that data trend lines are to be drawn from the youngest historical record with the assumption that the recent history (newer) is more meaningful than the less recent (or older) history. As such, the most recent historical data would be used to draw all the data trend lines and further each trend line will extend from more recent historical data to decreasingly less recent historical data.

In other words, defining $H_i$ be $\{h_0, h_1, \ldots, h_{i-1}\}$, which satisfies this constraint. Given the sixteen (16) historical records in FIG. 3A, there are fifteen (15) historical record sets: $H_2=\{h_0, h_1\}$, $H_3=\{h_0, h_1, h_2\}$, ..., and $H_{16}=\{h_0, h_1, h_2, \ldots, h_{15}\}$ available for determining data trend lines (or "trending").

Figure 4B:
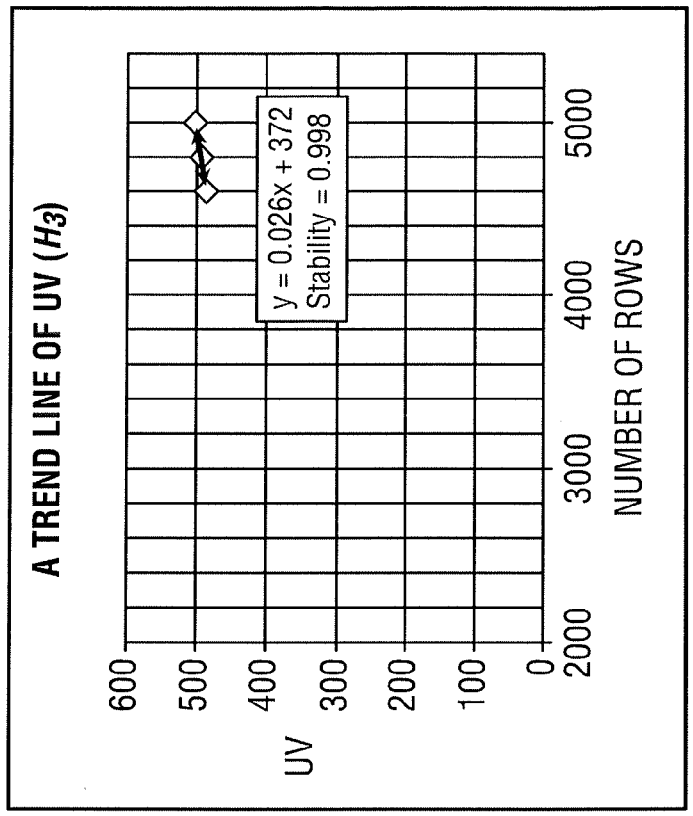
FIGS. 4A-4G depict data trend lines in accordance with embodiments of the invention.
Figure 4A:
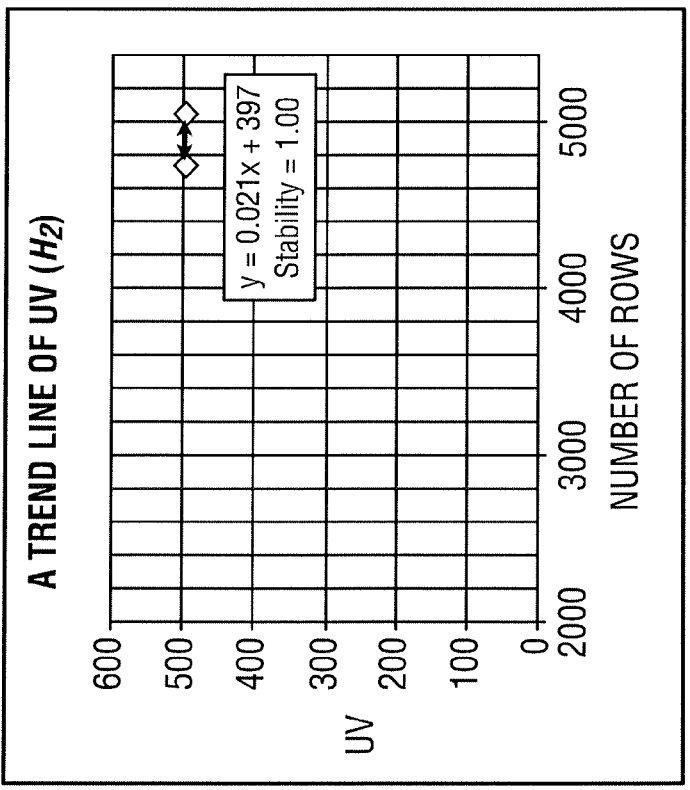
Figure 4D:
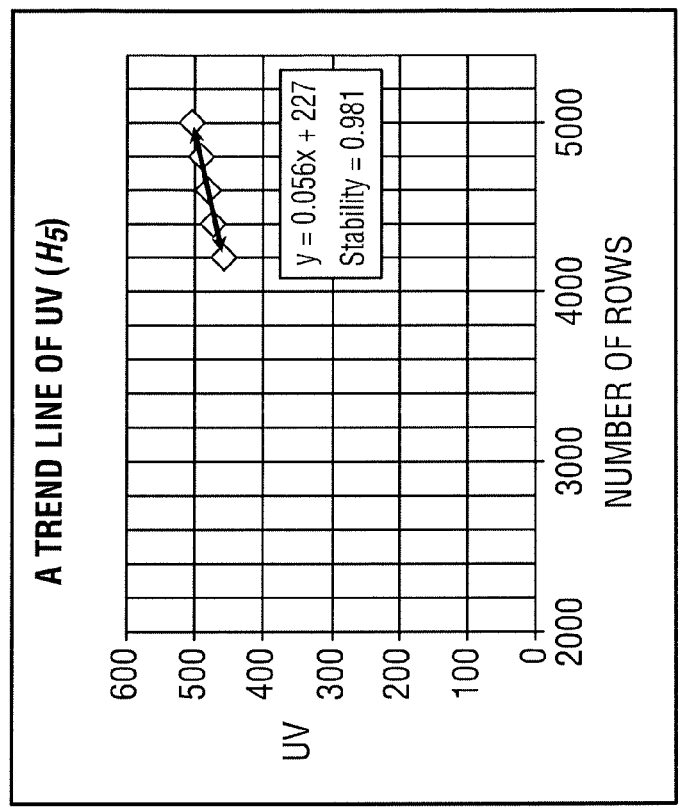
Figure 4C:
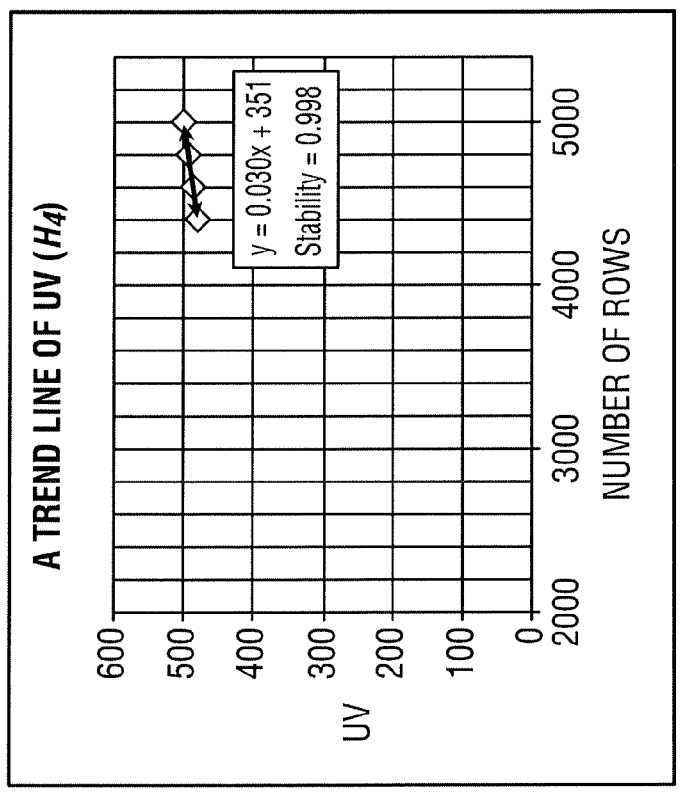
Figure 4F:
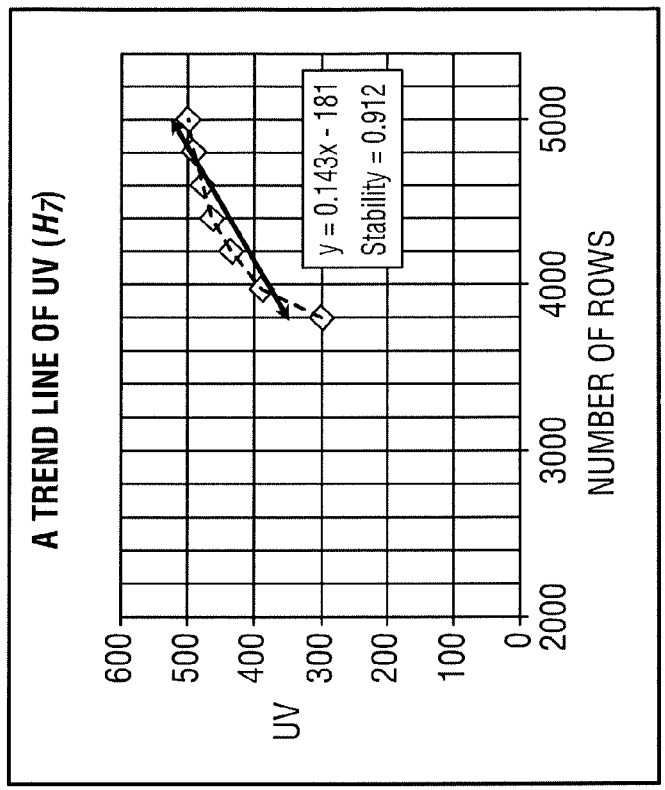
Figure 4E:
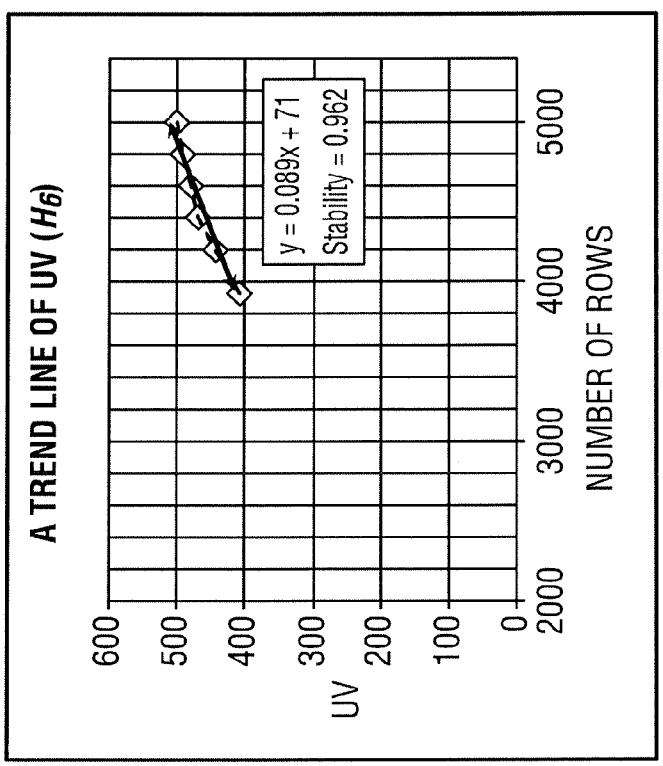
Figure 4G:
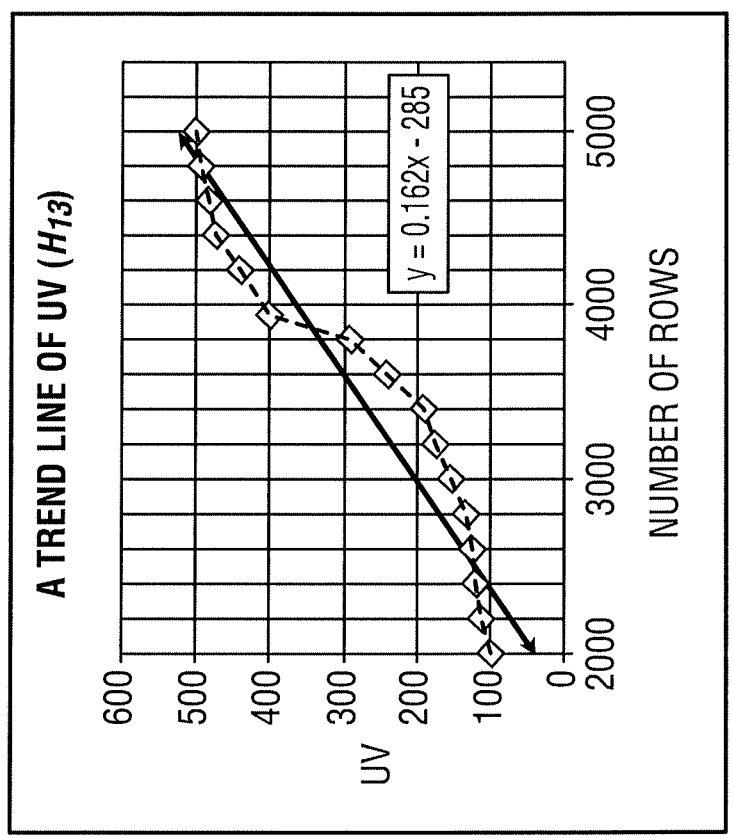

FIGS. 4A-4F depicts six (6) data trend lines drawn from $H_2$, $H_3$, $H_4$, $H_5$, $H_6$, and $H_7$ in accordance with one embodiment of the invention. It should be noted that trend lines drawn from $H_8$, $H_9$, ..., and $H_{16}$ are omitted in FIGS. 4A-4F for clarity but they can be provided in a similar manner as those shown in FIG. 4A-4F. FIG. 4G also depicts a trend line in accordance with one embodiment of the invention.

The second constraint or condition the can be considered is the stability of the data trend lines $H_2$ to $H_{16}$ (shown in FIG. 3). In other words, a data trend line can be considered to be stable if its stability is greater than a threshold. Data trend lines that are not stable are eliminated pursuant to the second constraint. The stability can, for example, be a normalized standard error (stderr) based on the average of y. A stable threshold value can, for example, be determined by a user according to their knowledge and experience with respect to changes or patterns of changes in a database. In this example, a threshold value 0.97 can be used solely for the purposes of further demonstrating elimination data trend lines that are not stable. As a result, among the six (6) trend lines in FIG. 4, only four (4) trend lines ($H_2$, $H_3$, $H_4$, $H_5$) can be considered to meet the threshold value of 0.97 and deemed to be stable. Please note that the stabilities of trend lines drawn $H_8$, $H_9$, ..., $H_{16}$ would be less than 0.97. Those skilled in the art will know that the following formula can, for example, be used to determine the stability of data trend lines in the example noted above.

$$stability = MAX\left[1 - \frac{n \cdot stderr}{\sum y}, 0\right]$$

The third and last constraint can simply be stated as selecting the data trend line that is longest stable data trend line. In other words, among the those qualifying the previous two (2) constraints, that data trend line that has the largest n value (number of historical records used for a data trend line which also represents the length of the data trend line. In the example described above, the data trend line $H_5$ would be selected from the remaining (those that have not been eliminated) data trend lines $H_2$, $H_3$, $H_4$, and $H_5$.

Figure 5A:
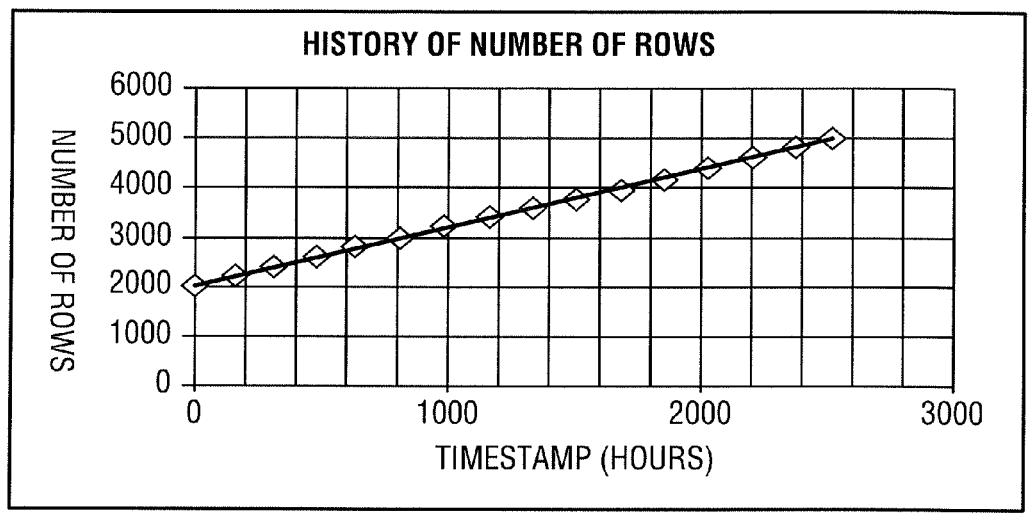
FIGS. 5A and 5B depict historical records and an estimation that can be made based on a data trend line in accordance with embodiments of the invention.
Figure 5B:
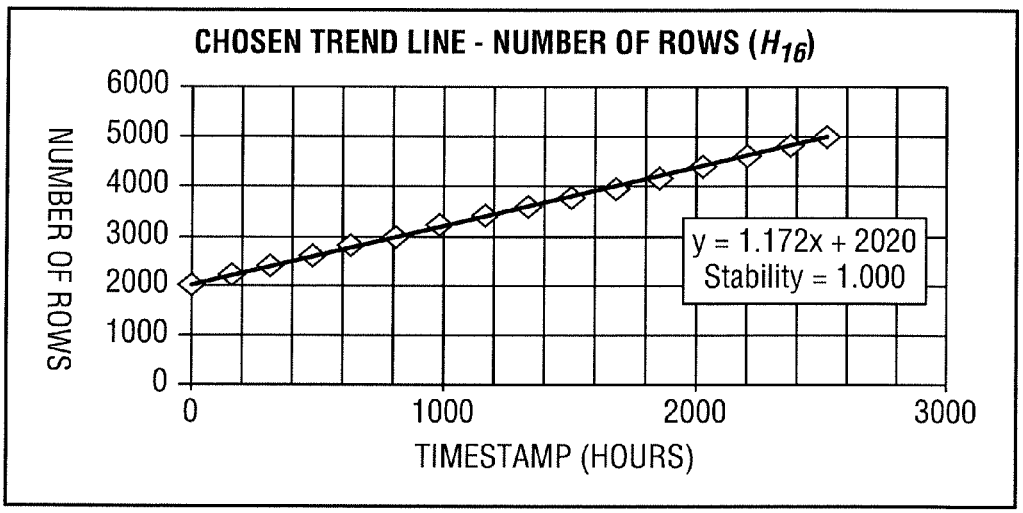

A selected data trend line (e.g., $H_5$ in the example above) can be used as an estimation trend to make estimations about the data of the database. For example, as depicted in FIG. 5B an estimation can be made based on a data trend line, y=1.172x+2020, chosen for extrapolating the number of rows, with a threshold 0.97 for a stability constraint in accordance with one embodiment of the invention. It should be noted that FIG. 5A depicts historical records of [timestamp, number of rows].

Figure 6A:
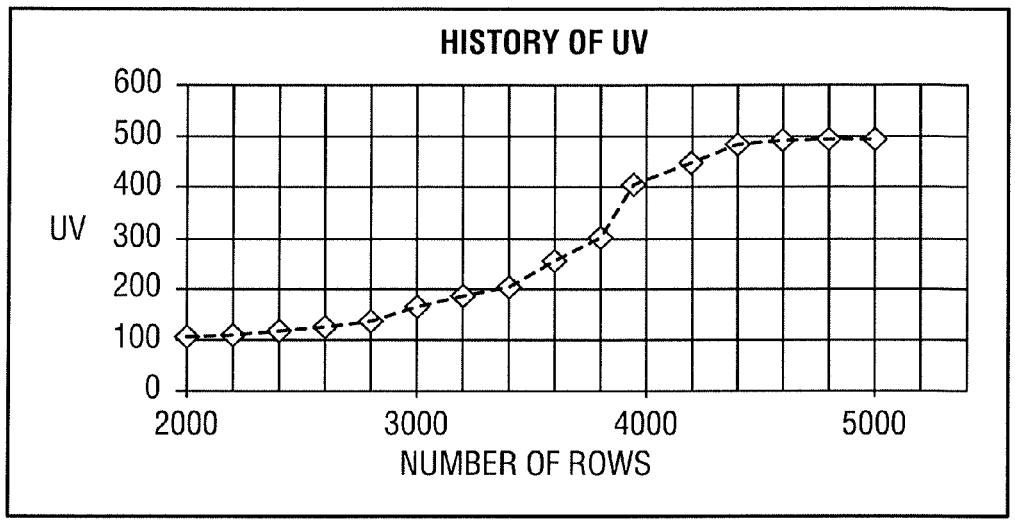
FIGS. 6A and 6B depict historical records and a chosen data trend line in accordance with embodiments of the invention.
Figure 6B:
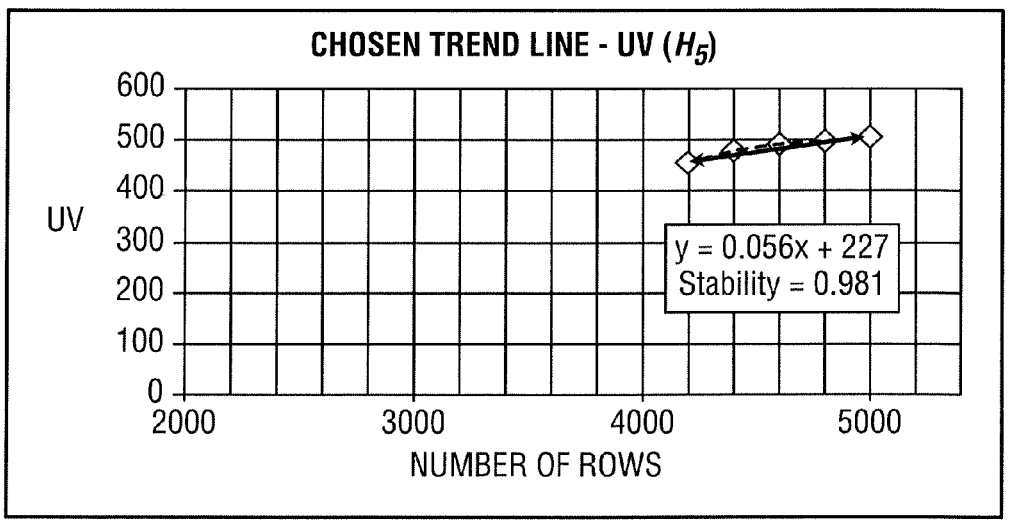
Figure 6C:
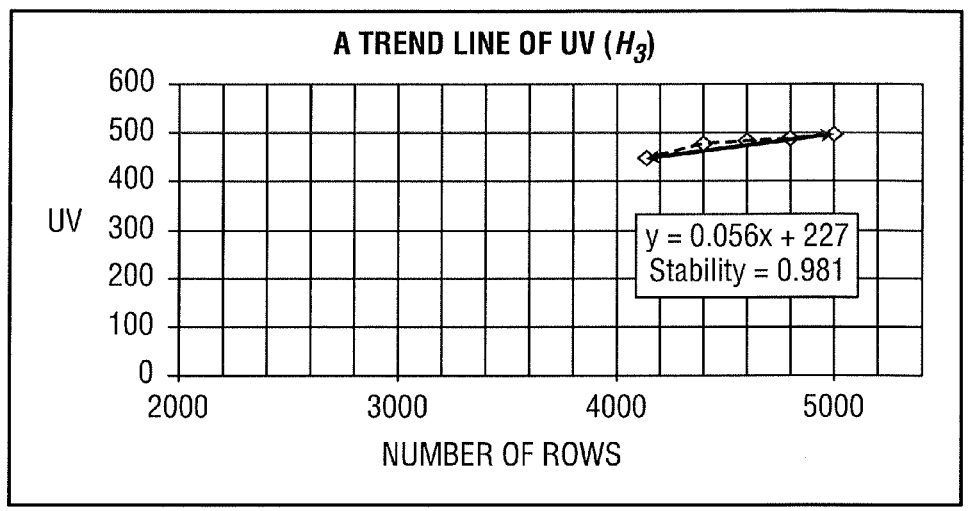
FIGS. 6C and 6D respectively depict a data trend lines before and after a shift has occurred in accordance with one embodiment of the invention.
Figure 6D:
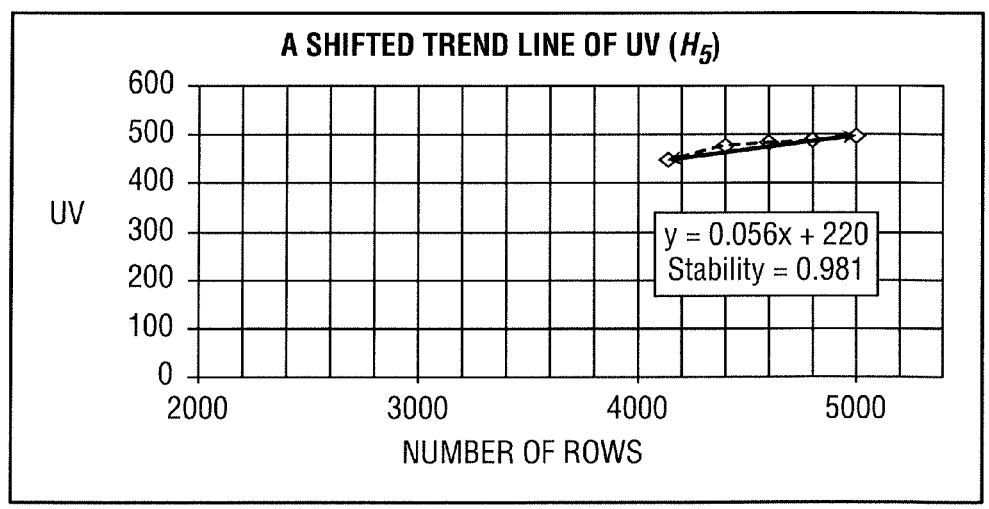

Similarly, FIG. 6A depicts historical records of [number of rows, number of unique values] and FIG. 6B shows a chosen data trend line (estimation trend line), y=0.056x+227, chosen for extrapolating/interpolating the number of unique values, for a given number of row in accordance with one embodiment of the invention. Again, it should be noted that the five (5) most recent historical records are used for the trend line depicted in FIG. 6B. Assuming there is a need to estimate the number of unique values when the number of rows is 5067, the estimated number of unique values can be determined based on the chosen data trend line as five hundred and eleven (511)=(0.056*5067+227).

It should also be noted that a data trend line can be used for making an estimation regarding the Statistics of a database. Furthermore, a data trend line can be shifted to the last historical record to allow estimation from the last historical record. The shifting can, for example, be done by adjusting the intercept of a data trend line, while maintaining the slope of the trend line. The slope can be used to follow a trend or change of a statistical value. To elaborate even further, FIGS. 6C and 6D respectively depicts a data trend line before and after a shift has occurred in accordance with one embodiment of the invention.

Furthermore, it should be noted that an estimation that has made based on historical records or historical data in accordance with the techniques of the invention can be combined with other estimated values and a weighted result can be used to determine a final estimation e that can be computed by the following formula:

$$e = \omega * e_h + (1-\omega) * e_p$$

$e_p$: estimated using other techniques,
$e_h$: estimated value based on a historical trend using the techniques of the invention
$\omega$: weight of $e_h$, which represents a degree that $e_h$ should be emphasized against $e_p$.

The weight w can, for example, be determined by a weight function. The weight w can represent the degree of confidence with respect to $e_h$ verses $e_p$. Intuitively, there is more confidence in $e_h$ when stability and n are high values. The weight function can, for example, satisfy the following properties. First, the weight should be 0 if there is only one history record, so $e_h$ should not be considered in computation of e. Second, the weight should be less than 1. Third, the greater n is, the higher the w can be. One example of a weight function satisfying the three properties is w=(n−1)/n. Another example is w=(n−1)*stability/n.

In view of the examples above, it should readily be apparent that the estimation of statistical value can, for example be done by the following steps. First, from the recent historical records, a trend line, y=slope*x+intercept, can be chosen. Second, the trend line can be shifted to the last history record (that is, the intercept can be adjusted). Third, $e_h$ can be calculate according to the trend line. In the example, the estimated number of rows can be estimated to be 5067 at a timestamp of 5600. The estimated number of unique values can be estimated to be 511, when the number of rows is 5067, and on. Fourth, w can be computed based on n (or based on both n and the stability value). Finally, an estimation value e can computed with w, $e_h$, and $e_p$.

Figures 7A, 7B:
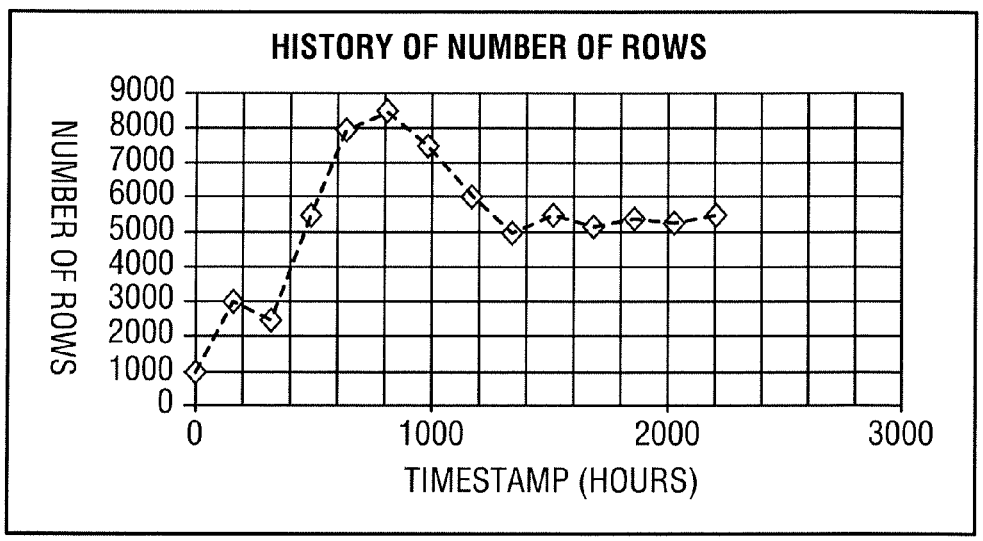
FIGS. 7A and 7B depict a number of statistical values and an exemplary set of historical records of a database that can be used by various embodiment of the invention.
Figure 7C:
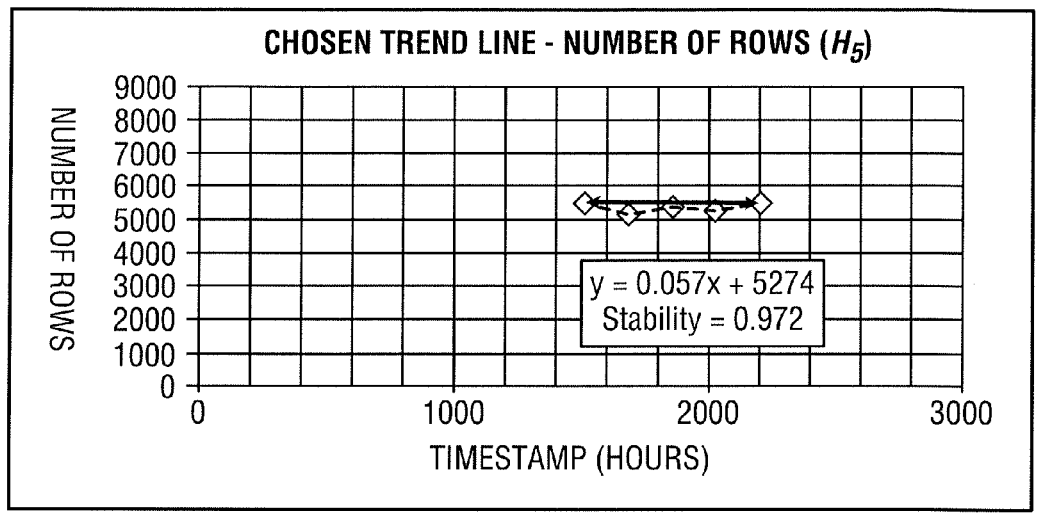
FIG. 7C depicts a data trend line selected or chosen for extrapolating the number of rows in accordance with one embodiment of the invention.
Figure 7D:
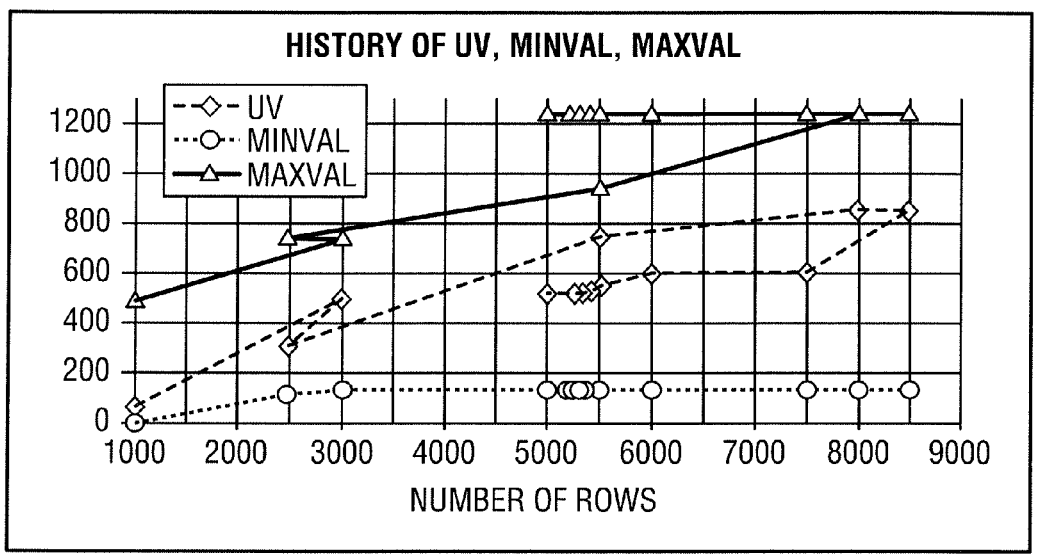
FIGS. 7D-E shows three (3) histories for UV, MinVal, and the corresponding chosen data trend lines in accordance with one embodiment of the invention.
Figure 7E:
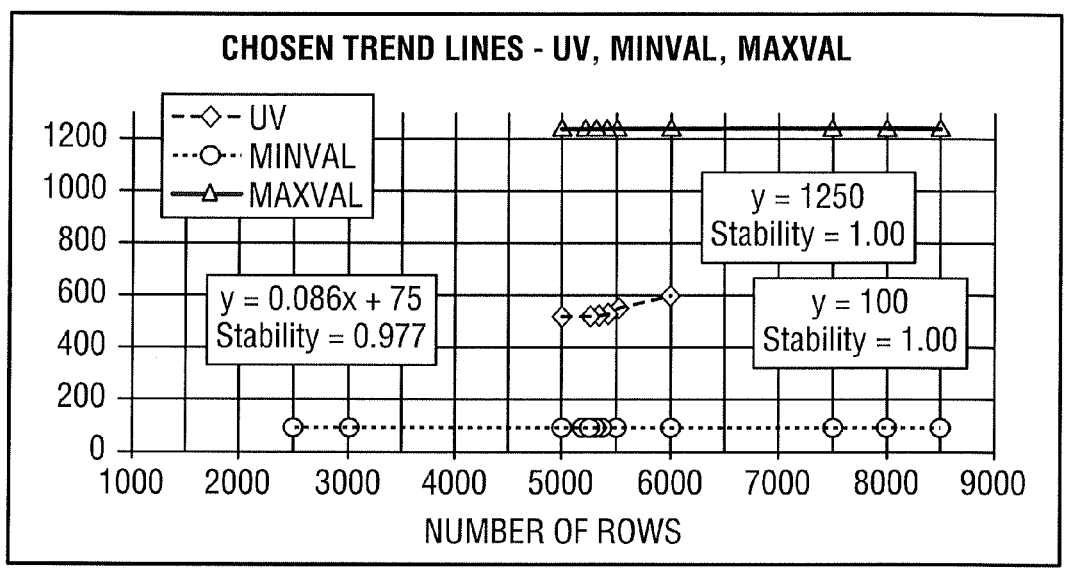

FIG. 7A-7D depict yet another example of selected data trend lines in accordance with one embodiment of the invention. Assuming a database workload that includes all types of database operations (i.e., insert, update, and delete), the statistics of interest can, for example, be the number of rows, the number unique values (UV), the minimum value (MinVal), and the maximum value (MaxVal) on the column item of the relation Orders. As such, FIG. 7A depicts a number of statistical values. FIG. 7B depicts an exemplary set of historical records of [timestamp, number of rows] for a database. FIG. 7C depicts a data trend line selected or chosen for extrapolating the number of rows. FIG. 7D shows three (3) histories for UV, MinVal, and MaxVal. Finally, FIG. 7E depicts the corresponding chosen data trend lines for UV, MinVal, and MaxVal.

Figure 8:
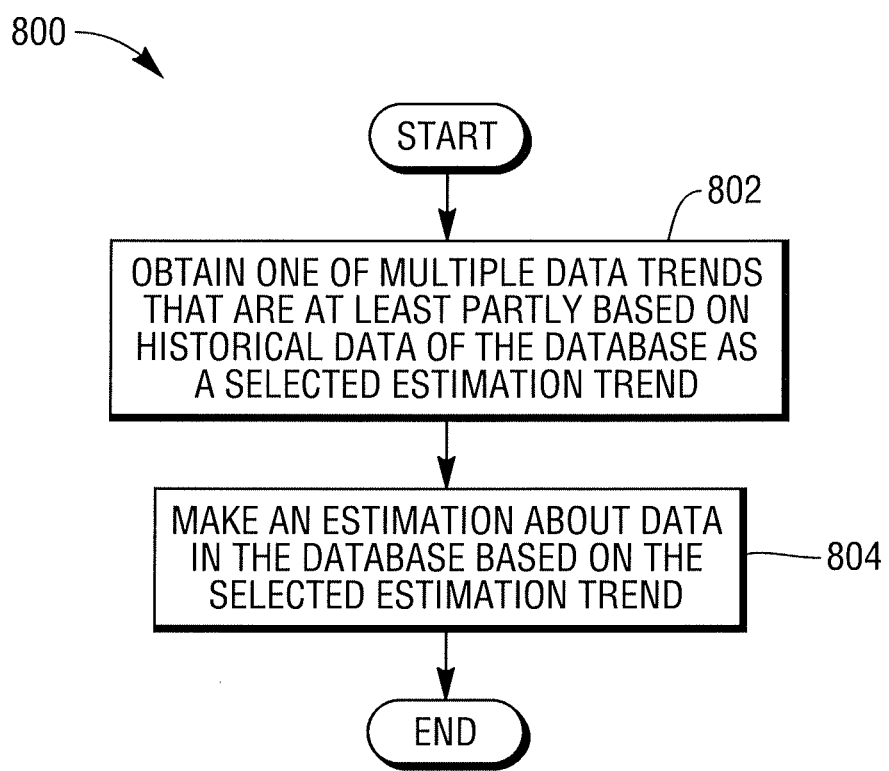
FIG. 8 depicts a method 800 for estimating data of a database in accordance with one embodiment of the invention.

To further elaborate, FIG. 8 depicts a method 800 for estimating data of a database in accordance with one embodiment of the invention. Method 800 can, for example, be used by the database estimator 102 shown in FIG. 1. Referring to FIG. 8, one of multiple data trends is obtained (802) for making an estimation about the database. It should be noted that the data trend can be selected form multiple data trends that are at least partly based on historical data of the database, where the historical data can be indicative of the data that has been stored in the database. After the selected data trend has been obtained (802), an estimation about the data in the database can be made (804) at least partly based on the selected estimation trend. Method 800 ends after an estimation about the data is made (804) for the database.

Figure 9:
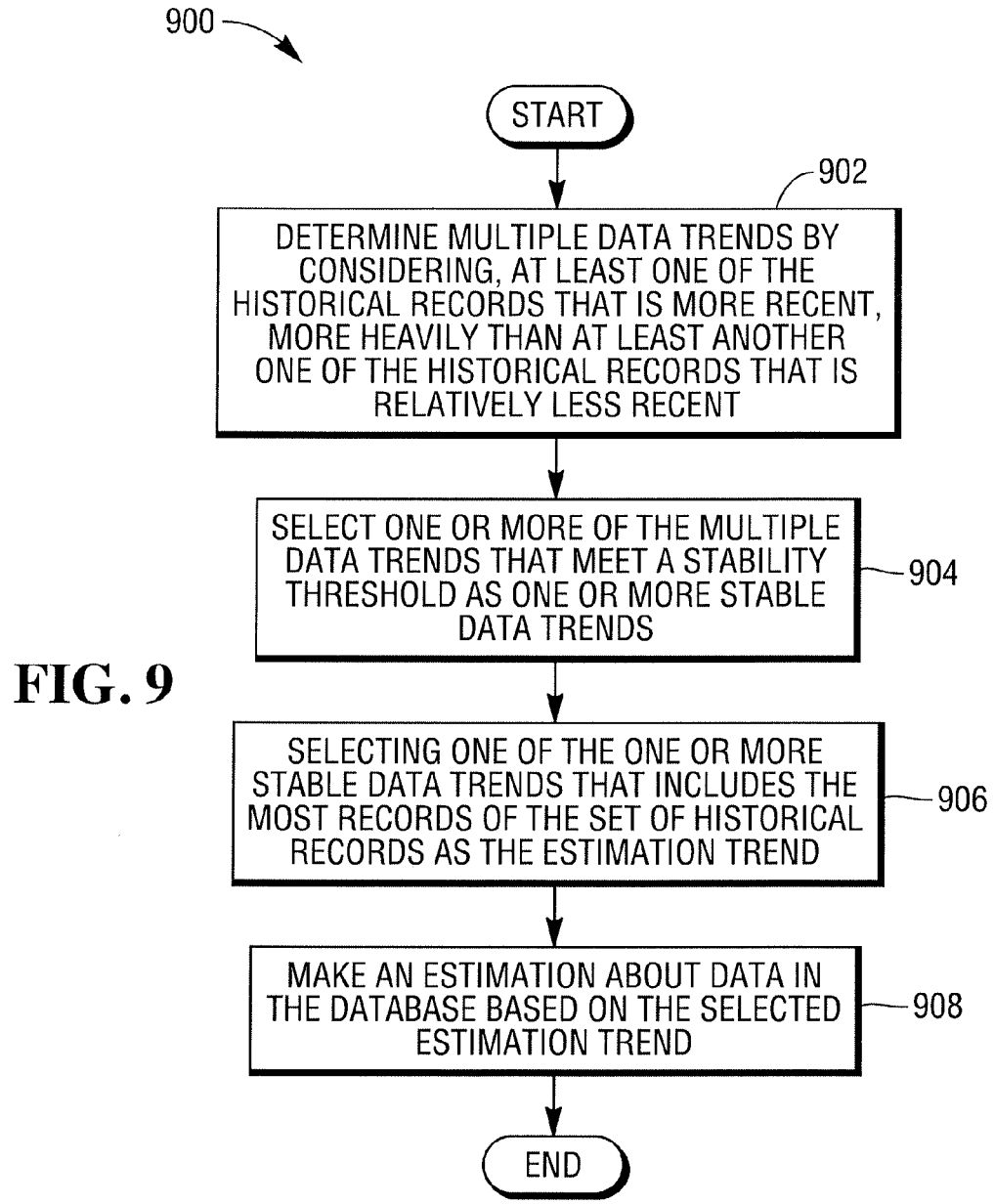
FIG. 9 depicts a method 900 making a projection about data of a database at least partly based on a set of historical records of the database in accordance with one embodiment of the invention.

To further even elaborate, FIG. 9 depicts a method 900 making a projection about data of a database at least partly based on a set of historical records of the database in accordance with one embodiment of the invention. Method 900 can, for example, be used by the database estimator 102 shown in FIG. 1. Referring to FIG. 9, initially, multiple data trends are considered (902) by considering, at least one of the historical records that is more recent, more heavily than, at least another one of the historical records that is relatively less recent. Next, one or more of the multiple data trends that meet a stability threshold are selected (904) as one or more stable data trends. Thereafter, one of the one or more stable data trends that includes the most historical records of the set of historical records is selected (906) as the estimation trend. Finally, an estimation about data in the database is made (908) based on the selected estimation trend.

Multi-Node, Parallel Database Systems

The techniques of the invention can be especially useful for large database systems, including multi-node, parallel database systems partly because of the cost associated with collecting Statistics in large database systems and the ever increasing need and desire to optimize execution of multiple database operations simultaneously. A multi-node parallel database system can, for example, use a massively parallel processing (MPP) architecture or system to perform various database operations in parallel. In addition, parallel processing system could provide additional benefits, for example, in parallel processing multiple linear trend analyses on multiple sets of history records (e.g., linear trend analyses on thousands of columns in a database system). Because linear trend analysis can be independent of each other, they can be processed in parallel.

For example, it could be beneficial to use a parallel processing system to perform linear trend analysis on a set of history records requiring computation of slope, intercept, and stderr, which can be computed as a Sum Of X, Sum Of Y, Sum Of $X^2$, Sum Of $Y^2$, and Sum Of 2X. If historical records for a linear trend analysis are stored in multiple computational spaces, these values can be computed in each space. In this case, a coordinating mechanism can be used to read the next recent historical record across the computation spaces although the overhead of such a mechanism may not be insignificant. Generally, Statistics can be used in a single space since it could relatively take less space than the data stored in the database. As such, historical data can be stored in a single space and processed for trending in accordance with the techniques of the invention in a accordance with the techniques of the invention.

Figure 10:
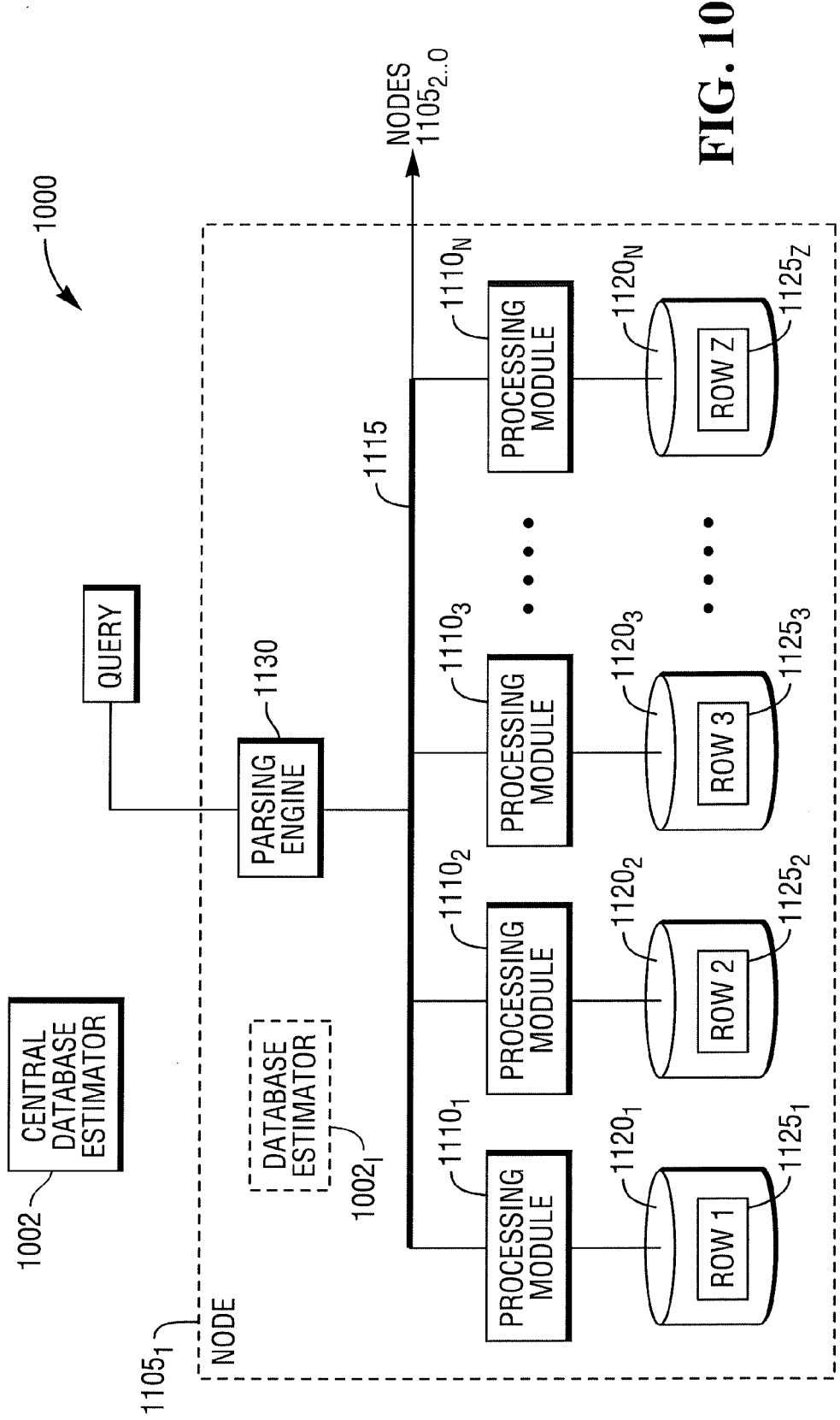
FIG. 10 depicts a database node of a database system or Database Management System (DBMS) in accordance with one embodiment of the invention.

To further elaborate, FIG. 10 depicts a database node 1105 of a database system or Database Management System (DBMS) 1000 in accordance with one embodiment of the invention. The database system 1000 can, for example, be provided as a Teradata Active Data Warehousing System. It should be noted that FIG. 10 depicts an exemplary architecture for one database node $1105_1$ of the DBMS 1000 in accordance with one embodiment of the invention. Referring to FIG. 10, the DBMS node $1105_1$ includes one or more processing modules 1110-N connected by a network 1115, that manage the storage and retrieval of data in data-storage facilities $1120_{1-N}$. Each of the processing modules 1110-N can represent one or more physical processors or virtual processors, with one or more virtual processors (e.g., Access Module Processer (AMP)) running on one or more physical processors.

For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. By way of example, if there are four (4) virtual processors and four (4) physical processors, then typically each virtual processor could run on its own physical processor. As such, assuming there are eight (8) virtual processors and four (4) physical processors, the operating system could schedule the eight (8) virtual processors against the four (4) physical processors, in which case swapping of the virtual processors could occur.

In the database system 1000, each of the processing modules $1110_{1-N}$ can manage a portion of a database stored in a corresponding one of the data-storage facilities $1120_{1-N}$. Also, each of the data-storage facilities $1120_{1-N}$ can include one or more storage devices (e.g., disk drives). It should be noted that the DBMS 1000 may include additional database nodes $1105_{2-O}$ in addition to the database node $1105_1$. The additional database nodes $1105_{2-O}$ are connected by extending the network 1115. Data can be stored in one or more tables in the data-storage facilities $1120_{1-N}$. The rows $1125_{1-z}$ of the tables can be stored across multiple data-storage facilities $1120_{1-N}$ to ensure that workload is distributed evenly across the processing modules $1110_{1-N}$. A parsing engine 1130 can organize the storage of data and the distribution of table rows $1125_{1-z}$ among the processing modules $1110_{1-N}$. The parsing engine 1130 can also coordinate the retrieval of data from the data-storage facilities $1120_{1-N}$ in response to queries received, for example, from a user. The DBMS 1000 usually receives queries and commands to build tables in a standard format, such as SQL.

In one implementation, the rows $1125_{1-z}$ are distributed across the data-storage facilities $1120_{1-N}$ by the parsing engine 1130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $1120_{1-N}$ and associated processing modules $1110_{1-N}$ by a hash bucket map. The characteristics of the columns chosen for the primary index determine how evenly the rows are distributed.

Referring to FIG. 10, it should be noted that a database estimator 1002 can be provided. It should be noted that the database estimator 1002 can be provided as a separate central entity (or component, or module) severing all of the database nodes 1105 or it can at least partially be implemented in the parsing engine 1130 of the database node $1105_i$ or another one the nodes 1105 (not shown).

Figure 11:
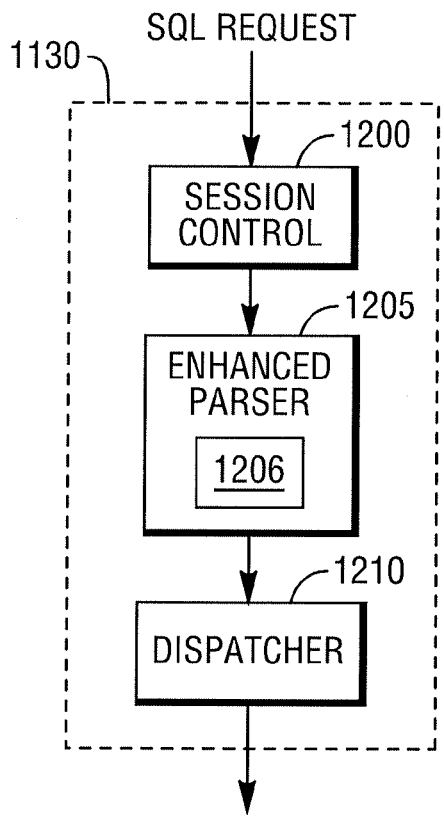
FIG. 11 depicts a parsing engine in accordance with one embodiment of the invention.
Figure 12:
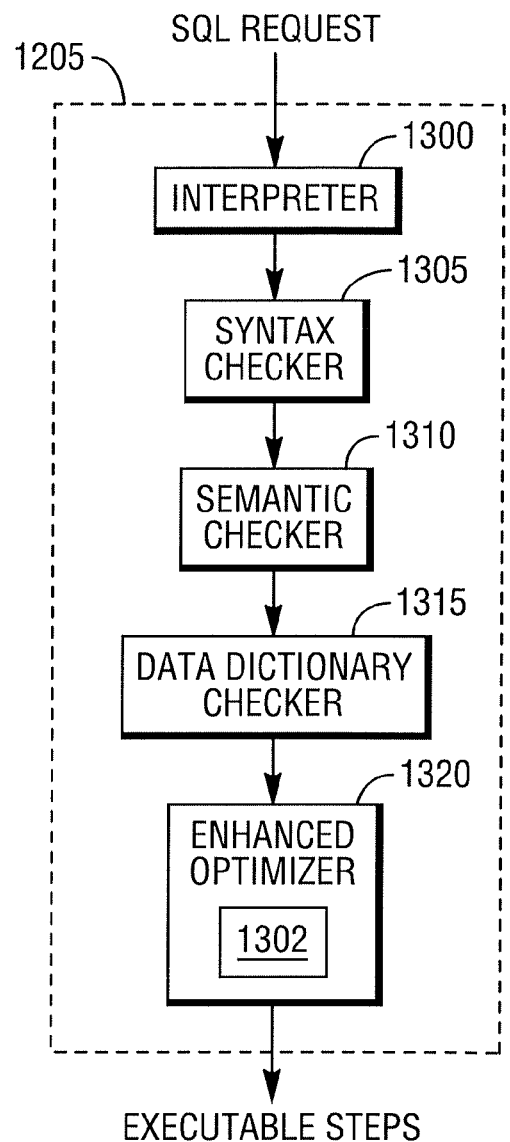

In one exemplary system, the parsing engine 1130 is made up of three components: a session control 1200, an enhanced parser 1205, and a dispatcher 1210, as shown in FIG. 11. The enhanced parser 1205 can provide a database estimator 1206 in accordance with one embodiment of the invention. The session control 1200 provides the logon and logoff function. It accepts a request for authorization to access the database, verifies it, and then either allows or disallows the access. When the session control 1200 allows a session to begin, a user may submit a SQL request, which is routed to the parser 1205. The dispatcher 1210 provides an internal status of every session and request running on the system. It does this by using internal messages sent from the AMPs to the dispatcher 1210. The dispatcher 1210 provides an internal status of every session and request running on the system. It should be noted that an enhanced parser 1205 can effectively provide a database estimator 1202 in accordance with one embodiment of the invention.

As illustrated in FIG. 11, the enhanced parser 1205 interprets the SQL request (block 1300), checks it for proper SQL syntax (block 1305), evaluates it semantically (block 1310), and consults a data dictionary to ensure that all of the objects specified in the SQL request actually exist and that the user has the authority to perform the request (block 1305). Finally, the parser 1205 runs an enhanced optimizer (block 1320), which generates the least expensive plan to perform the request. It will be appreciated that an enhanced optimizer (block 1320) can provide a database estimator 1302 in accordance with one embodiment of the invention.

In view of the foregoing, it will be appreciated that the invention can have many advantages and embodiments of the invention can provide one or more of these advantages. One advantage is that expensive statistics recollection can be postponed, or a statistics recollection cycle can become longer. This can be especially useful in large data warehousing environments where data can change in a consistent manner or exhibit a consistent trend in changes to the data. Another advantage is that the invention can be used for non-linear changes in data (or data trends) (e.g., an S-shape, a J-shape, or a log-shape), as well as those that are linear. Yet another advantage is the invention can be used for virtually any type of database operation or data change (i.e., insert, update, and delete). In addition, the invention can be used for virtually any type of statistics estimation (e.g., the number of rows, the number of unique values, the maximum value, the minimum value, the number of nulls, etc.) Also, the invention can be used with other existing extrapolation/interpolation techniques. Still further, the linear data trending operations of the invention (e.g. computing slope, intercept, and stderr of a trend line) can be cost efficient: O(N) for a given N number of history records. That means that a historical record does not need to be read multiple times for trending.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of estimating data of a database, the computer-implemented method comprising:
    obtaining one of multiple data trends as a selected estimation trend, wherein the multiple data trends are at least partly based on historical data of the database which is indicative of history of data that has been stored in the database;
    selecting one or more of the multiple data trends that meet a stability threshold as one or more stable data trends;
    selecting one of the one or more stable data trends that includes most data of the historical data as the estimation trend; and
    making an estimation about the database at least partly based on the selected estimation trend.

2. The computer-implemented method of claim 1, wherein the historical data includes a set of historical records, and wherein the data trends are at least partly based on a more recent historical record in the historical data that also includes at least one less recent historical record which is less recent than the more recent historical record.

3. The computer-implemented method of claim 1, wherein the historical data includes a set of historical records, and wherein the computer-implemented method further comprises: determining the multiple data trends by considering, at least one of the historical records that is more recent, more heavily than, at least another one of the historical records that is relatively less recent.

4. The computer-implemented method of claim 1, wherein the computer-implemented method further comprises: determining the multiple data trends at least partly based on multiple historical records of the historical data of the database, by considering at least a most recent historical record in the historical record more heavily than at least one less recent historical record of the historical data.

5. The computer-implemented method of claim 1, wherein the computer-implemented method further comprises: determining multiple trend lines, each from a most recent historical data record in the historical data to decreasingly less recent historical data records.

6. The computer-implemented method of claim 1, wherein the computer-implemented method further comprises: selecting the selected estimation trend from the multiple data trends.

7. The computer-implemented method of claim 1, wherein the historical data includes a set of historical records, and wherein the selecting one of the multiple data trends as an estimation trend comprises: selecting one of the one or more stable data trends that is representative of and/or based on a largest number of historical records of the set of historical records.

8. The computer-implemented method of claim 1, wherein the making of an estimation about the database comprises one or more of the following: making an estimation about data that has been stored in the database; making a prediction about data that might be stored in the database in future; and making a projection about the data of the database.

9. The computer-implemented method of claim 1, wherein the historical data includes a set of historical records, and wherein the making of the estimation about the data comprises on or more of the following: making an estimation about data that has been stored in the database since the most recent historical record in set of historical records; and making an prediction about data that may be stored in the database in future.

10. A computer-implemented method of estimating data of a database at least partly based on a set of historical records of the database, the computer-implemented method comprising:
    determining multiple data trends by considering, at least one of the historical records that is more recent, more heavily than, at least another one of the historical records that is less recent than the more recent historical record;
    selecting one or more of the multiple data trends that meet a stability threshold as one or more stable data trends;
    selecting one of the one or more stable data trends that includes most of the historical records of the set of historical records as an estimation trend; and
    making an estimation about data in the database at least partly based on the selected estimation trend.

11. The computer-implemented method of claim 10, wherein the considering of the at least one historical record that is more recent comprises considering at least a most recent historical record in the set of historical records.

12. The computer-implemented method of claim 10, wherein each one of the multiple data trends are based and/or include a most historical record in the set of historical records, and wherein each one of the data trends consider the more recent historical records more than less recent historical records of the historical records.

13. The computer-implemented method of claim 10, wherein the determining of multiple data trends comprises: determining multiple linear trend lines, each from a most recent historical data record in the historical data to decreasingly less recent historical data records.

14. The computer-implemented method of claim 13, wherein the selecting one of the one or more stable data trends comprises: determining the stability of each one of the multiple linear trend lines at least partly based on their respective slope, intercept and standard error to select one or more of the multiple trend lines as one or more stable trend lines.

15. The computer-implemented method of claim 14, wherein the selecting of the estimation trend comprises: selecting a longest one of the one or more stable trend lines as an estimation trend line for the estimation trend.

16. The computer-implemented method of claim 10, wherein the computer-implemented further comprises: shifting at least one the data trend lines to a most recent historical record of the historical records to obtain at least one shifted trend line; and replacing the at least one data trend line with the at least one shifted trend.

17. A system that includes one or more processors operable to:
    obtain one of multiple data trends as a selected estimation trend, wherein the multiple data trends are at least partly based on historical data of a database, indicative of history of data that has been stored in the database;
    select one or more of the multiple data trends that meet a stability threshold as one or more stable data trends;
    select one of the one or more stable data trends that includes most data of the historical data as the estimation trend; and
    make an estimation about the database at least partly based on the selected estimation trend.

18. The system of claim 17, wherein the historical data includes a set of historical records, and wherein the data trends are at least partly based on a more recent historical record in the historical data that also includes at least one less recent historical record which is less recent than the more recent historical record.

19. The system of claim 17, wherein the historical data includes a set of historical records, and wherein the one or more processors are further operable to determine the multiple data trends by considering, at least one of the historical records that is more recent, more heavily than, at least another one of the historical records that is relatively less recent.

20. The system of claim 17, wherein the one or more processors are further operable to determine the multiple data trends at least partly based on multiple historical records of the historical data of the database, by considering at least a most recent historical record in the historical record more heavily than at least one less recent historical record of the historical data.

21. The system of claim 17, wherein the one or more processors are further operable to determine multiple trend lines, each from a most recent historical data record in the historical data to decreasingly less recent historical data records.

22. The system of claim 17, wherein the one or more processors are further operable to select the selected estimation trend from the multiple data trends.

23. The system of claim 17, wherein the historical data includes a set of historical records, and wherein the selecting one of the multiple data trends as an estimation trend comprises: selecting one of the one or more stable data trends that is representative of and/or based on a largest number of historical records of the set of historical records.

24. The system of claim 17, wherein the making of an estimation about the database comprises one or more of the following: making an estimation about data that has been stored in the database; making a prediction about data that might be stored in the database in future; and making a projection about the data of the database.

25. The system of claim 17, wherein the historical data includes a set of historical records, and wherein the making of the estimation about the data comprises on or more of the following: making an estimation about data that has been stored in the database since the most recent historical record in set of historical records; and making an prediction about data that may be stored in the database in future.

26. A non-transitory computer readable medium storing at least executable code that when executed by a computing system estimates data of a database, wherein the executable code includes executable code that when executed by the computing system:
   obtains one of multiple data trends as a selected estimation trend, wherein the multiple data trends are at least partly based on historical data of the database which is indicative of history of data that has been stored in the database;
   selects one or more of the multiple data trends that meet a stability threshold as one or more stable data trends;
   selects one of the one or more stable data trends that includes most data of the historical data as the estimation trend and makes an estimation about the database at least partly based on the selected estimation trend.

27. The non-transitory computer readable medium of claim 26, wherein the historical data includes a set of historical records, and wherein the data trends are at least partly based on a more recent historical record in the historical data that also includes at least one less recent historical record which is less recent than the more recent historical record.

28. The non-transitory computer readable medium of claim 26, wherein the historical data includes a set of historical records, and wherein the executable code further determining the multiple data trends by considering, at least one of the historical records that is more recent, more heavily than, at least another one of the historical records that is relatively less recent.

29. The non-transitory computer readable medium of claim 26, wherein the executable code further determines the multiple data trends at least partly based on multiple historical records of the historical data of the database, by considering at least a most recent historical record in the historical record more heavily than at least one less recent historical record of the historical data.

30. The non-transitory computer readable medium of claim 26, wherein the executable code further determines multiple trend lines, each from a most recent historical data record in the historical data to decreasingly less recent historical data records.

31. The non-transitory computer readable medium of claim 26, wherein the executable code further selects the selected estimation trend from the multiple data trends.

32. The non-transitory computer readable medium of claim 26, wherein the historical data includes a set of historical records, and wherein the selecting one of the multiple data trends as an estimation trend comprises: selecting one of the one or more stable data trends that is representative of and/or based on a largest number of historical records of the set of historical records.

33. The non-transitory computer readable medium of claim 26, wherein the making of an estimation about the database comprises one or more of the following: making an estimation about data that has been stored in the database; making a prediction about data that might be stored in the database in future; and making a projection about the data of the database.

34. The non-transitory computer readable medium of claim 26, wherein the historical data includes a set of historical records, and wherein the making of the estimation about the data comprises on or more of the following: making an estimation about data that has been stored in the database since the most recent historical record in set of historical records; and making an prediction about data that may be stored in the database in future.

* * * * *